United States Patent
Kuramoto

[19]

[11] Patent Number: 5,886,838
[45] Date of Patent: Mar. 23, 1999

[54] DOOR MIRROR WITH A SMALL DEAD ANGLE

[76] Inventor: Atsushi Kuramoto, 2872-2 Oaza Arita, Chiyoda-Cho, Yamagata-Gun, Hiroshima-Ken, Japan

[21] Appl. No.: 770,440

[22] Filed: Dec. 20, 1996

[30] Foreign Application Priority Data

Dec. 22, 1995 [JP] Japan ................................. 7-350521

[51] Int. Cl.$^6$ ............................. G02B 5/08; G02B 7/182; B60R 1/06
[52] U.S. Cl. ..................... 359/841; 359/843; 359/874; 359/876; 359/877; 359/881; 248/480; 248/487; 362/83.1
[58] Field of Search .................... 359/841, 843, 359/872, 873, 874, 876, 877, 881; 248/479, 480, 484, 485, 486, 487; 362/83.1

[56] References Cited

U.S. PATENT DOCUMENTS

| | | | |
|---|---|---|---|
| 4,466,594 | 8/1984 | Sharp | 248/487 |
| 4,558,930 | 12/1985 | Deedreek . | |
| 4,907,871 | 3/1990 | Hou | 359/841 |
| 4,936,669 | 6/1990 | Wun | 359/881 |
| 5,008,603 | 4/1991 | Nakayama et al. . | |
| 5,148,325 | 9/1992 | Wang | 359/841 |
| 5,210,651 | 5/1993 | Shibuya et al. | 359/877 |
| 5,375,014 | 12/1994 | Fujie et al. | 359/877 |
| 5,572,376 | 11/1996 | Pace | 359/872 |

FOREIGN PATENT DOCUMENTS

| | | |
|---|---|---|
| 96 12 0506 | 6/1997 | European Pat. Off. . |
| 2 579 149 | 9/1986 | France . |
| 2 655 298 | 6/1991 | France . |
| 3211478 A1 | 9/1983 | Germany . |
| 43 42 168 A1 | 6/1995 | Germany . |
| 61-188242 | 1/1987 | Japan . |
| 3-67735 | 6/1991 | Japan . |
| 1177752 | 1/1970 | United Kingdom . |
| 2 261 201 | 5/1993 | United Kingdom . |
| WO 91/19626 | 12/1991 | WIPO . |

*Primary Examiner*—Ricky D. Shafer
*Attorney, Agent, or Firm*—Finnegan, Henderson, Farabow, Garrett & Dunner, L.L.P.

[57] ABSTRACT

A door mirror with a small dead angle which enables the driver to easily see the areas where the right and left front and rear wheels are touching the ground that could not been seen with conventional door mirrors due to dead angles, and to easily see the horizontal forward direction (if there are oncoming cars) on the side of the assistant driver's seat at the time of passing another car ahead by manipulating buttons on the driver's seat and, then, automatically returns to its initial state. The door mirror with a small dead angle comprises a support arm which includes a straight-moving screw, a slide plate that slides in the lengthwise direction thereof, and a mirror case pivoted on the slide plate to rotate. The door mirror may be further equipped with movable sources of light, may be constructed so as to be folded and may contain a fine adjustment mechanism in the mirror case. The door mirror is further equipped with a control/electrically moving mechanism by which the mirror case is automatically moved up to the coordinates that have been set in advance in a CPU enabling the driver to see the otherwise dead-angled areas, and the mirror case is returned back either manually or automatically.

6 Claims, 6 Drawing Sheets

DOOR MIRROR WITH A SMALL DEAD ANGLE

BACKGROUND OF THE INVENTION

1. Field of the Invention

The present invention relates to a vehicle door mirror with a small dead angle. More specifically, the invention relates to a door mirror with a small dead angle which makes it possible to easily see areas where the right and left front and rear wheels of a vehicle are touching the ground that could not been seen with the conventional door mirrors, and to easily observe the horizontal forward direction on the side of a vehicle front passenger seat at the time of passing another car ahead by manipulating buttons at the driver's seat.

2. Description of the Prior Art

A variety of contrivances have heretofore been proposed to decrease dead angles of a vehicle door mirror from the standpoint of safety.

Japanese Unexamined Patent Publication No. 116568/1993 discloses a device for changing the visual field of a rearview mirror by turning at least one of either the right door mirror or the left door mirror by a required angle in a direction in which the dead angle will be eliminated based upon a control signal output from a control means in response to at least either an on-signal or an off-signal from a turn signal lamp switch of a vehicle (or in response to an on-signal from a reverse gear detection switch).

According to this disclosure, the mirror automatically returns back to the original position after use. However, the door mirror is not allowed to swivel, which does not take into account a change in the position of the eyes when the car is driven by a different driver. Also, when traveling forward, the movement of the mirror is triggered by the on-signal of the turn signal lamp switch; i.e., the areas of dead angles come into a visual field after the turn signal is output. When driving into a travel lane from a ramp on an expressway or when changing lanes in an ordinary manner, therefore, the turn signal is flashed first without observing the rear view. This invites danger in that the vehicle may be struck from the rear by a succeeding car. Also, it could happen that the distances to the succeeding cars were incorrectly recognized, since the visual field obtained in this state was different from the visual field obtained at an ordinary position.

Japanese Unexamined Patent Publication No. 191349/1994 proposes a rearview mirror that eliminates dead angles, according to which when it is attempted to enter into, or come out from, a garage or a parking area, the visual field near the rear wheels is maintained by moving mirrors that are remotely controlled by electricity, hydraulic pressure or pneumatic pressure. According to this proposal, however, the moving mirrors move by only a small amount. Moreover, in the case of a car with a right-side steering wheel, it is impossible to watch the front left wheel from the driver's seat. In addition, fine adjustment cannot be accomplished to correspond with the position of the driver's eyes.

In Japan, the U.K., and some other countries, cars keep to the left and have a steering wheel on the right side of the car. However, many imported cars manufactured in foreign countries still have a steering wheel on the left side. When used, for example, in Japan, cars with a left-side steering wheel have a demerit in that difficulty is involved in passing another car ahead particularly in oncoming traffic lane. If the right-side mirror could be automatically controlled to a preset position where it faces forward in a horizontal direction and if the horizontal forward view could be seen, then, the presence of the oncoming cars can be easily confirmed without the risks of moving into the right lane to an excess degree. It is then made possible for a driver of a car with a left-side steering wheel to safely Pass the car ahead. With the conventional simply constructed remotely-controlled door mirror, however, a lot of time is needed for adjusting the mirror position, and the door mirror cannot be quickly moved to an angle for seeing the horizontal forward view in a "one-touch" operation and cannot be quickly returned back to the initial position. The same problem holds true for the cars with right-side steering wheels when they are used in countries where the traffic rule requires cars to keep to the right.

In an attempt to provide a wide-view door mirror that is very useful for vehicles in garages and parking areas, and for moving the vehicles back and forth on very narrow roads, the present inventors have conducted careful studies and have arrived at the present invention after experimenting with structures and methods, such as sliding the door mirror itself along a support arm that extends in the direction of width of the car and digitally setting the directions in advance.

SUMMARY OF THE INVENTION

An object of the present invention is to provide a door mirror with a small dead angle, according to which the mirror surface of the door mirror on one side or on both sides is automatically moved to an angular position that is set in advance when an indoor switch is operated by a driver at any time. As a result, the field which is usually within the dead angle comes into the visual field temporarily. Then, the mirror surface automatically returns to its original position.

Another object of the present invention is to provide a door mirror with a small dead angle which makes it easier for the drivers of cars with an opposite side steering wheel (as imported cars).

A further object of the present invention is to provide a door mirror with a small dead angle which enables the position and angle of the mirror surface to be adjusted finely and easily depending upon a change in the position of the eyes when a car is used by a different driver.

A still further object of the present invention is to provide a door mirror with a small dead angle which is held within the amount of protrusion beyond the car body of a conventional door mirror, and which can be expanded as required and can be stored.

A still further object of the present invention is to provide a door mirror with a small dead angle that is capable of covering otherwise dead-angled visual fields, offering a dazzle-proof view to the driver and having movable sources of light that move together with the mirror surface.

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

According to the present invention, there is provided a vehicle door mirror comprising a base; a support arm pivotally attached to the base; a worm gear in the support arm; a guide arranged in the support arm; a slide plate that pivotally engages slides in a lengthwise direction of the support arm along the guide; and a mirror case pivotally attached to the slide plate. It is preferred that at least one of the mirror case and the support arm has a movable source of light thereon. Preferably, the base comprises a base plate and an auxiliary plate pivotally attached to the door, and the support arm is pivotally attached to the auxiliary plate. The mirror case may comprise a rearview mirror case having a mirror surface, and a mechanism for finely adjusting a viewing angle of the mirror surface longitudinally and transversely with respect to the vehicle.

In the preferred embodiment, the mirror has an ordinary mirror surface position set by a vehicle operator for viewing the rear of the vehicle, and a plurality of dead angle mirror surface positions predetermined by a vehicle operator for allowing the vehicle operator to view visual fields which are not clearly visible when the mirror is in the ordinary mirror position. The mirror may also include a control unit responsive to signals from a CPU, the CPU including stored information corresponding to the dead angle mirror surface positions, and the control unit generating signals to move the mirror to position the mirror surface in a selected one of the dead angle mirror surface positions. It is preferred that the CPU also include stored information corresponding to the ordinary mirror position, and that the control unit include a circuit for generating signals to move the mirror to the ordinary mirror position, the circuit being responsive to at least one of activation of a manually operated switch, passage of a predetermined period of time, attainment of a predetermined forward traveling speed of the vehicle, and deactivation of an ignition switch of the vehicle.

It is to be understood that both the foregoing general description and the following detailed description are exemplary and explanatory only and are not restrictive of the invention, as claimed.

BRIEF DESCRIPTION OF THE DRAWING

The accompanying drawings, which are incorporated in and constitute a part of this specification, illustrate one embodiment of the invention and together with the description, serve to explain the principles of the invention. In the drawings.

DESCRIPTION OF THE PREFERRED EMBODIMENT

Reference will now be made in detail to the present preferred embodiment of the invention, an example of which is illustrated in the accompanying drawings.

Referring to FIGS. 1 to 8, reference numeral 1 denotes a door mirror with a small dead angle according to an embodiment of the present invention, 2 denotes a base plate, 3 denotes a mirror surface, 4 denotes a support arm, 5 denotes a straights moving screw or worm-type gear, 6 denotes a guide, 8 denotes a slide plate, 10 denotes a mirror case, and symbol L denotes movable sources of light. In the following description, only the left-side door mirror is described. From the description of the left-side door mirror, it is apparent to one skilled in the art to make and use corresponding parts of the door mirror on the right side.

The door mirror 1 according to this embodiment is basically constituted by a plastic or metallic hollow base plate 2 secured by bolts or the like to a front end portion of a front door of a car or other vehicle, a support arm 4, which extends nearly in the direction of width of the vehicle body from the base plate 2 and is pivotally attached to rotate substantially in the forwardly and reversely rotating directions of the wheel, and a mirror case 10 which is pivotally attached near the central upper portion of the support arm 4 to rotate substantially in the directions in which the front wheels are directed. The mirror case 10 is equipped with nighttime illumination lamps L.

Figure 1:
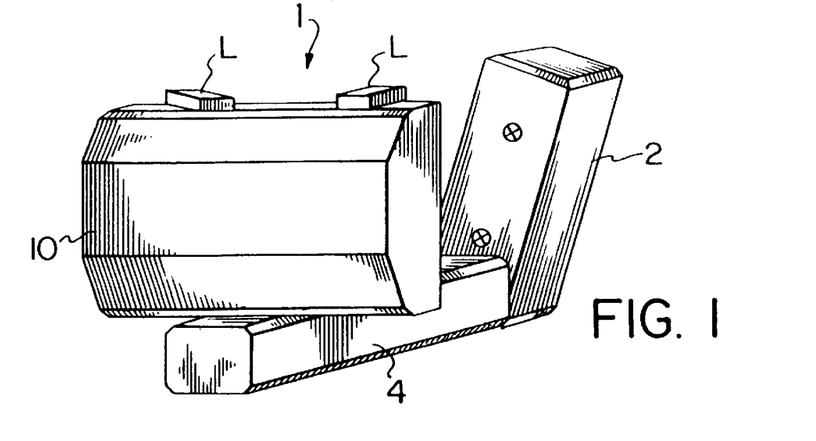
FIG. 1 is a perspective view of a left-side door mirror of a vehicle having a right-side steering wheel enabling the front left wheel to be seen according to one embodiment of the invention.
Figure 2:
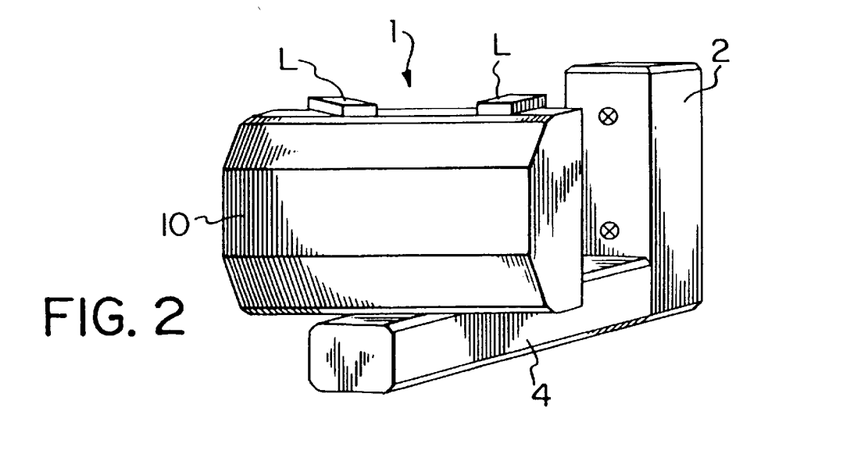
FIG. 2 is a perspective view of the left-side door mirror of FIG. 1 in an intermediate attitude (moving) to enable the front left wheel to be seen according.
Figure 3:
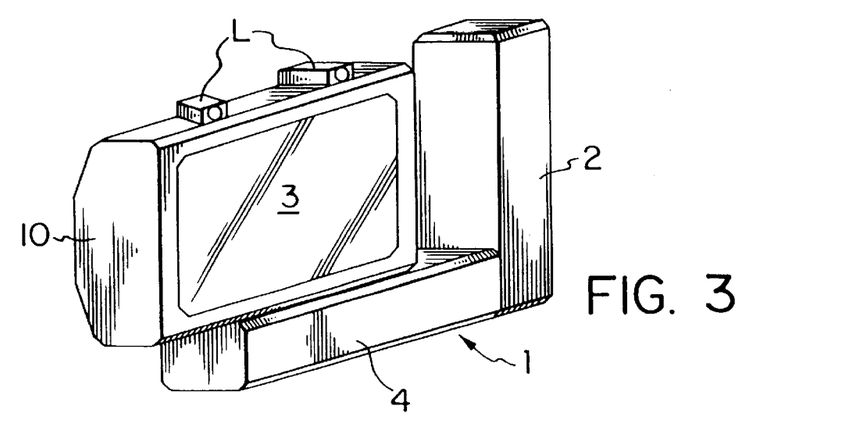
FIG. 3 is a perspective view of the left-side door mirror of FIG. 1 in an intermediate attitude (moving) in which a mirror case 10 has moved in a horizontal direction only.
Figure 4:
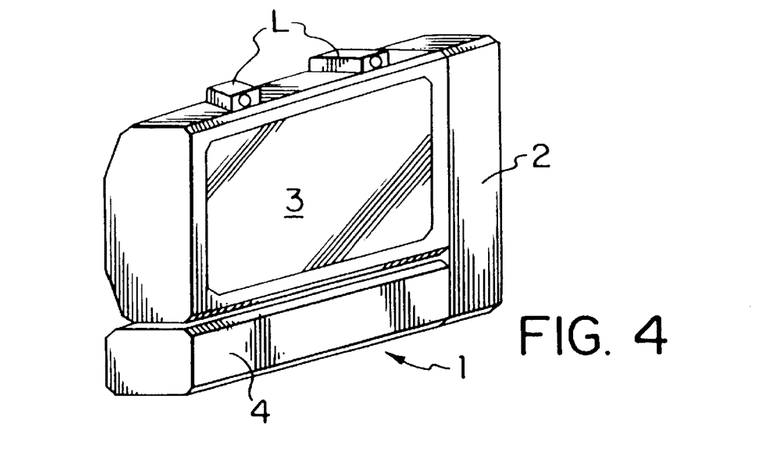
FIG. 4 is a perspective view of the left-side door mirror of FIG. 1 in a standard state (during the ordinary driving condition) set by a driver.
Figure 5:
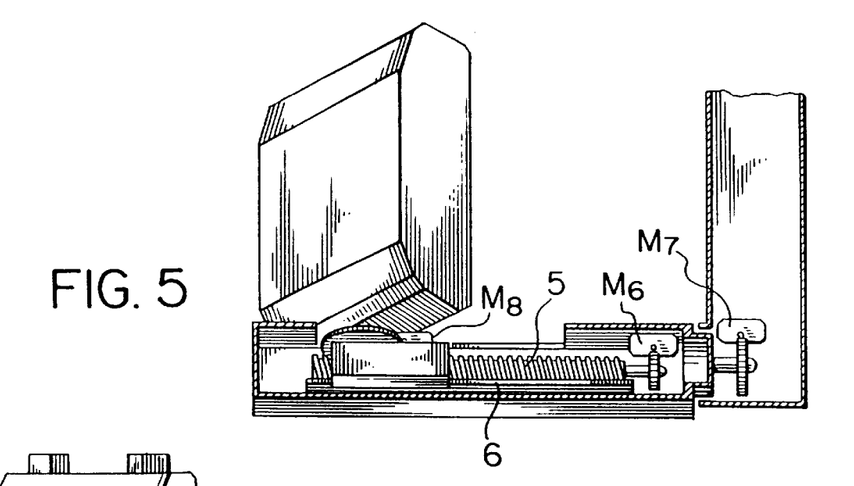
FIG. 5 is a sectional view illustrating part of the embodiment of FIG. 1.
Figure 6:
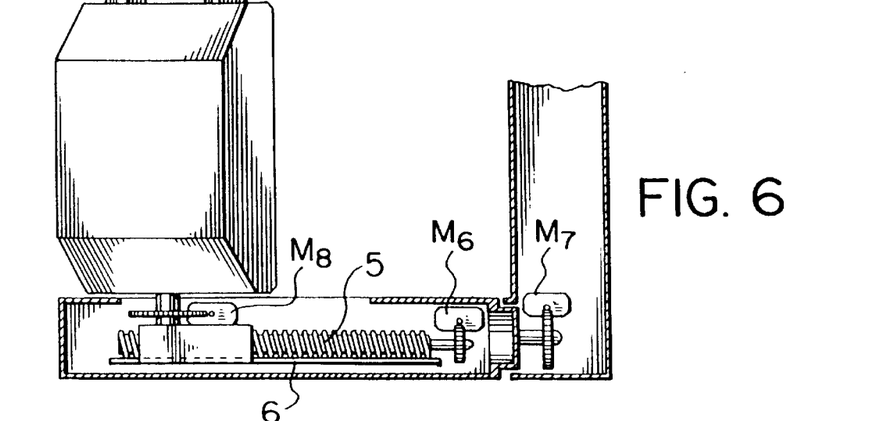
FIG. 6 is a sectional view illustrating part of the left-side door mirror according to the embodiment shown in FIG. 2.
Figure 7:
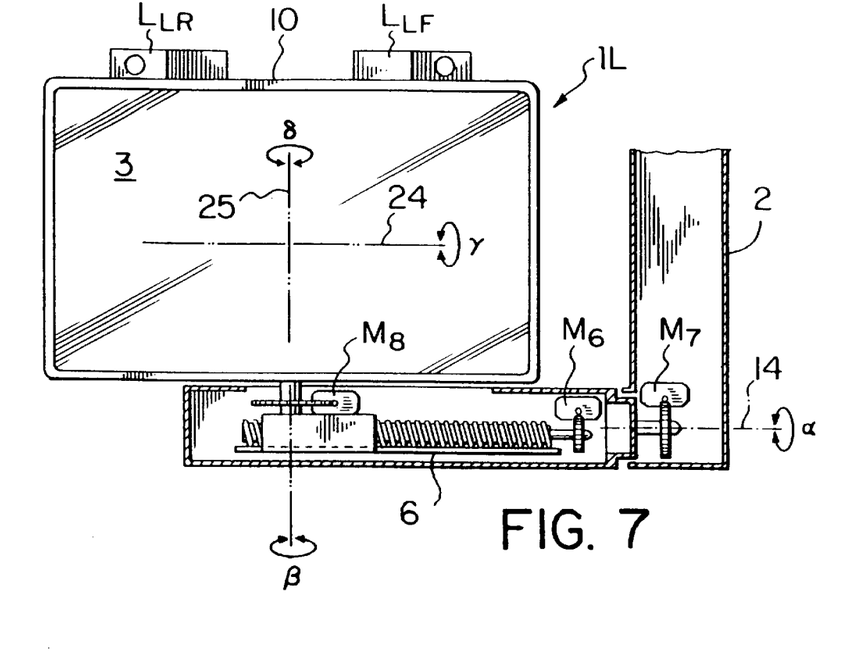
FIG. 7 is a sectional view illustrating part of the embodiment shown in FIG. 3.

The mirror case 10 is equipped with a widely known device for finely adjusting the angle of the mirror surface. A pair of movable sources of light (nighttime illumination lamps) L are mounted on the upper portions of the mirror case in a nonparallel manner to be widened in a direction opposite to the mirror surface. When either one of these nighttime illumination lamps L is turned on, light is not directly projected into the eyes of the driver if small lamps (parking lamps) or head lamps are illuminated, and, when another special switch is activated. The lamps L not activated while confirming the existence of oncoming cars (when the mirror case is directed in a forward horizontal direction) so the driver may attempt to pass another car ahead. Therefore, the drivers of oncoming cars are not dazzled by these light sources.

Figure 10:
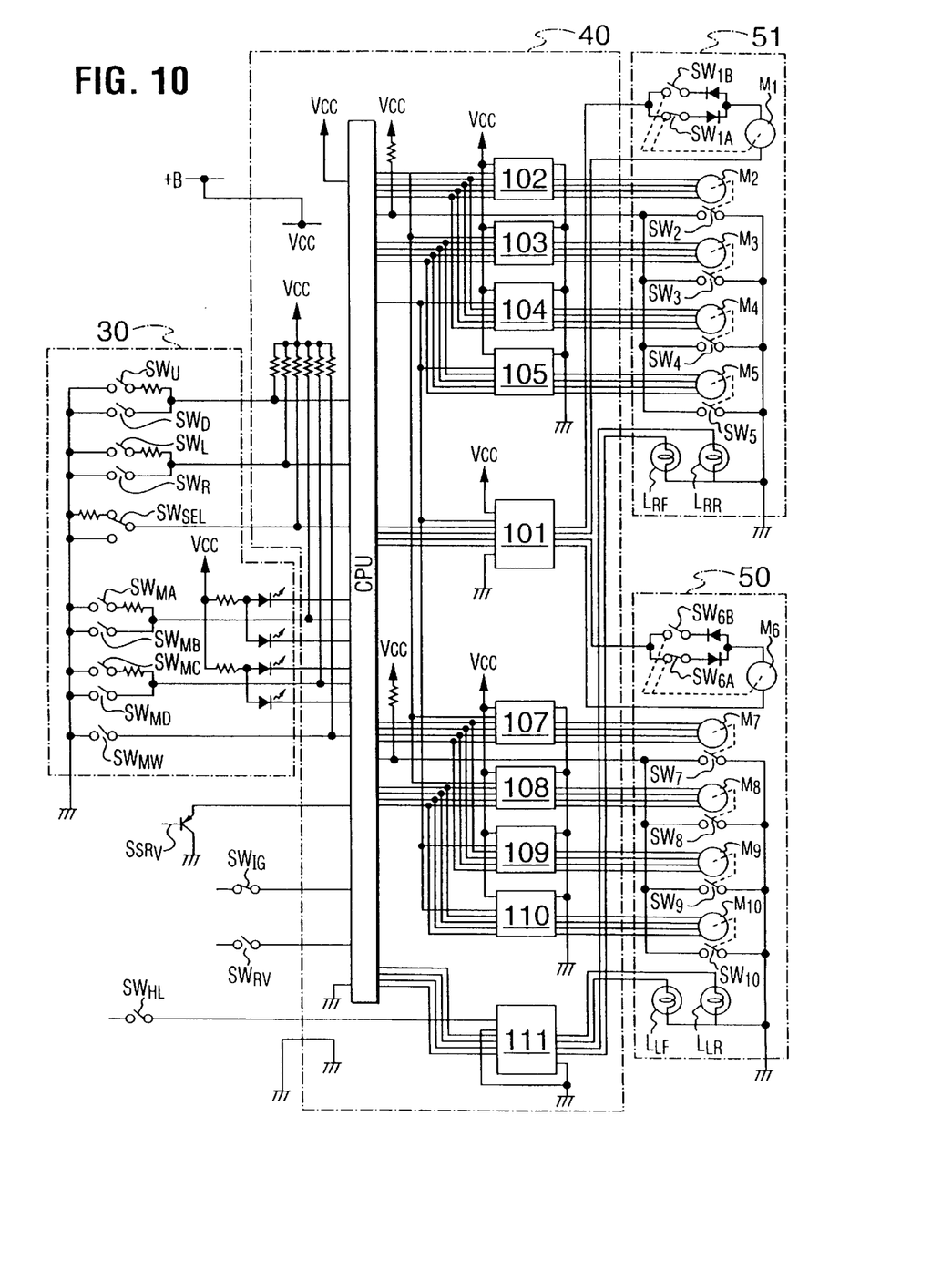
FIG. 10 is a wiring diagram of a mirror control system in accordance with the invention.

FIG. 10 is a wiring diagram of a mirror control system which is generally includes by a mirror control unit 40, drive units 50, 51 inside the right and left mirrors, and a mirror controller 30.

The mirror control unit 40 comprises a CPU (microprocessor) (not shown), motor drive circuits 101, 102, 103, 104, 105, 107, 108, 109, 110, and a lamp turn-on circuit 111. The CPU sends drive signals related to turning certain switches on and off to the motor drive circuits 101 to 110, and stores the rotational angles of several motors, described below. Upon receiving signals from the CPU, the motor drive circuits 101 to 110 feed drive voltages to motors $M_1$ to $M_{10}$ of the drive units 50 and 51 in the right and left mirrors. Upon receiving a turn-on signal from the CPU and being supplied with electric power through a light switch $SW_{HL}$ the lamp turn-on circuit 111 supplies a turn-on voltage to the nighttime illumination lamps of the drive units 50 and 51 in the right and left mirrors.

The drive unit 50 in the left mirror includes a straight-moving screw motor $M_6$, a storing position limit switch $SW_{6A}$ and an expanded position limit switch $SW_{6B}$ for halting the straight-moving screw motor $M_6$ at a predetermined position. An α-axis motor $M_7$ and a β-axis motor $M_8$ for turning the mirror case, a γ-axis motor $M_9$ and a δ-axis motor $M_{10}$ for finely adjusting the mirror surface are also included in drive unit 50. Limit switches $SW_7$, $SW_8$, $SW_9$ and $SW_{10}$ are provided for detecting points that serve as references for controlling the α-axis, β-axis, γ-axis and δ-axis, and nighttime the drive unit 50 also includes illumination lamps $L_{LF}$ and $L_{LR}$. The straight-moving screw motor $M_6$ is preferably a DC motor, and other motors $M_7$, $M_8$, $M_9$ and $M_{10}$ are preferably step motors. Like the drive unit 50 in the left mirror, the drive unit 51 in the right mirror includes a straight-moving screw motor, expanded position and storing position limit switches $SW_{1A}$ and $SW_{1B}$, motors $M_2$, $M_3$, $M_4$ and $M_5$ of the α-axis, β-axis, γ-axis and δ-axis, limit switches $SW_2$, $SW_3$, $SW_4$ and $SW_5$, and nighttime illumination lamps $L_{RF}$ and $L_{RR}$.

Figure 9:
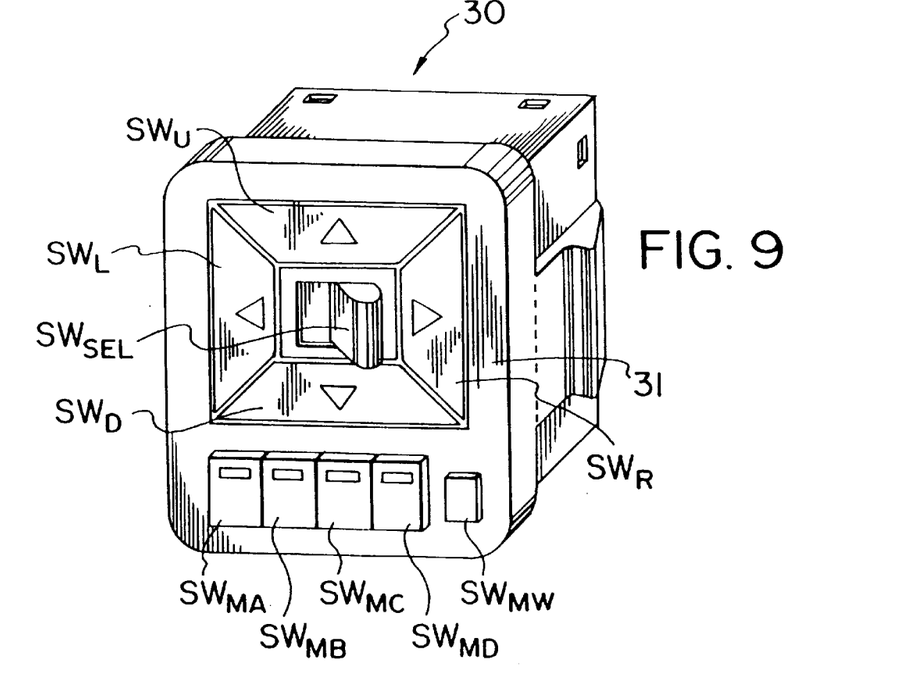
FIG. 9 is a perspective view of a mirror controller in accordance with the invention.

FIG. 9 shows the appearance of a mirror controller 30, wherein a front panel 31 includes longitudinal and transverse fine adjustment switches $SW_u$, $SW_D$, $SW_L$ and $SW_R$, a right-and-left change-over switch $SW_{SEL}$, memory operation switches $SW_{MA}$, $SW_{MA}$, $SW_{MB}$, $SW_{MC}$ and $SW_{MD}$, and an indicator LED. The longitudinal and transverse fine adjustment switches $SW_u$ and $SW_D$ are used to control the angle of γ-axis of the mirror surfaces 3 and to control the angle of the α-axis of the support arms 4. Longitudinal and transverse fine adjustment switches $SW_L$ and $SW_R$ are used to control the angle of the δ-axis of the mirror surfaces 3 and to control the angle of the β-axis of the mirror cases 10. A right-and-left change-over switch $SW_{SEL}$ transmits to the CPU information as to which one of the drive units in the right and left mirrors is selected. The memory operation switches are used to store in the c~u the state of the drive units in the right and left mirrors, and to reproduce from the CPU the state of the drive units of the right and left mirrors.

Figure 11:
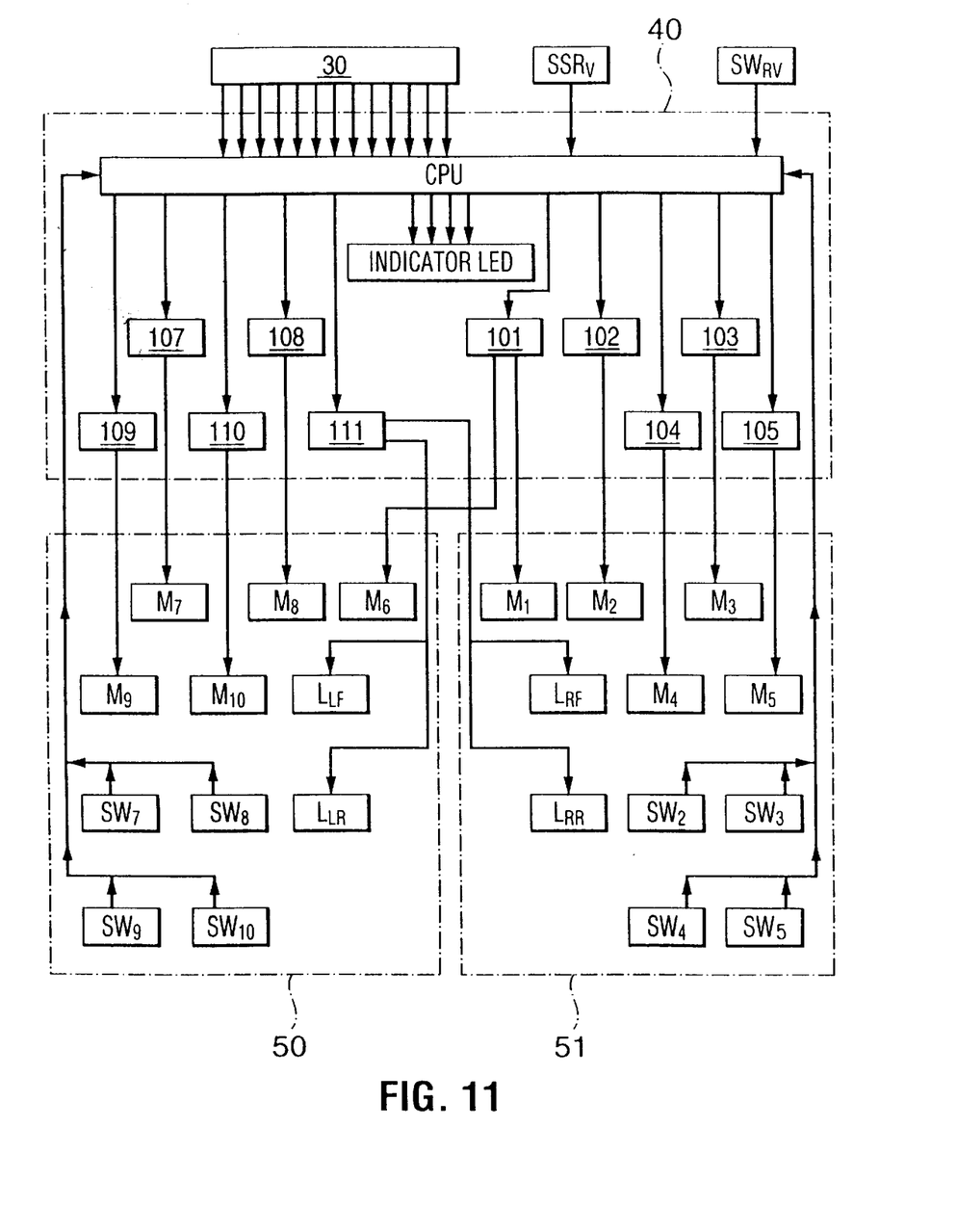
FIG. 11 is a block diagram of the mirror control system of FIG. 10.
Figure 12:
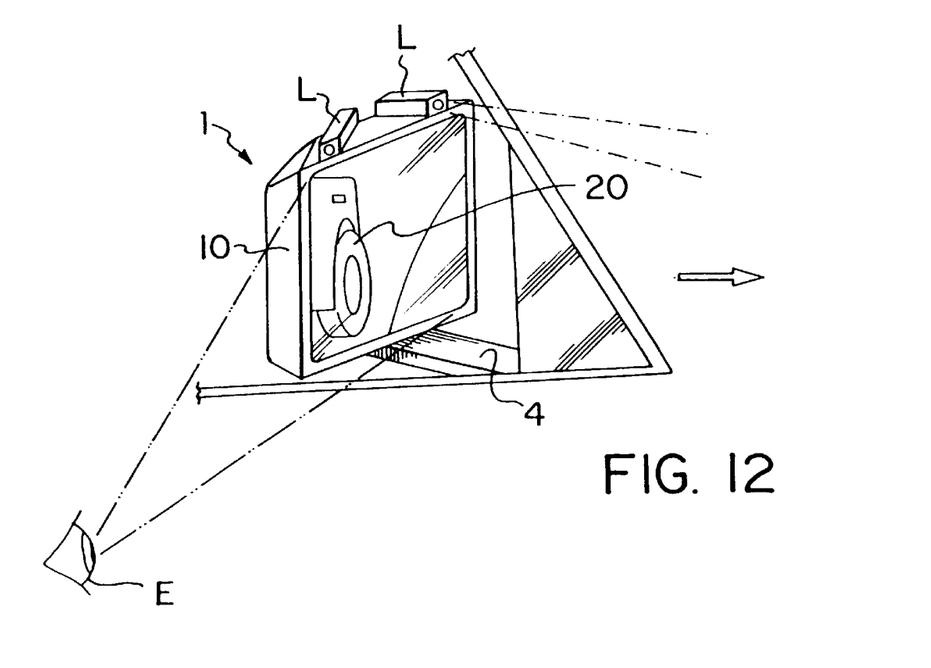
FIG. 12 is a perspective view illustrating a state where the front left wheel 20 is seen by an eye E of a driver and the arrow indicates the forward travelling direction of the vehicle.

FIG. 11 is a block diagram illustrating a control relationship in the mirror control system.

The operation of this embodiment will now be described with reference to FIG. 10.

[1] Operation of the mirror in an ordinary driving condition.

When the up-and-down direction adjustment switches $SW_u$ and $SW_D$ and the right-and-left direction adjustment swatches $SW_R$ and $SW_L$ of the mirror controller 30 are depressed while, the key switch $SW_{IG}$ is being closed, the CPU causes, through the drive circuits 104, 109, 105 and 110, the γ-axis motor $M_4$ or $M_9$ and the δ-axis motor $M_5$ or $M_{10}$ to be rotated in the directions in which the adjustment switches are depressed in the mirror of either side selected by the right-and-left change-over switch $SW_{SEL}$. The CPU converts the rotational angles (deviations from the origins) of the motors when they are stopped into pulse counts, and stores the pulse counts as return positions set by the driver. The origins are those positions where the limit switches $SW_2$, $Sw_3$, $3w_4$, $Sw_5$, $SW_7$, $Sw_8$, $SW_9$, and $SW_{10}$ are closed.

[2] Setting the mirror position again.

(1) When the IG key switch $SW_{IG}$ is moved to closed from the open state, the CPU drives, through the straight-moving screw drive circuit 101, the right mirror straight-moving screw motor $M_6$ toward the returning direction for a predetermined period of time (e.g., five seconds). The slide plates 8 (see FIG. 8) move in correspondence with the turning of the straight-moving screw and come to a stop at a return position where the return position limit switches $SW_{1A}$ and $SW_{6A}$ are opened. However, when the switches $SW_{1A}$ and $SW_{6A}$ are opened at a time when the IG Key switch $SW_{IG}$ is closed, the slide plates 8 do not move.

Figure 8:
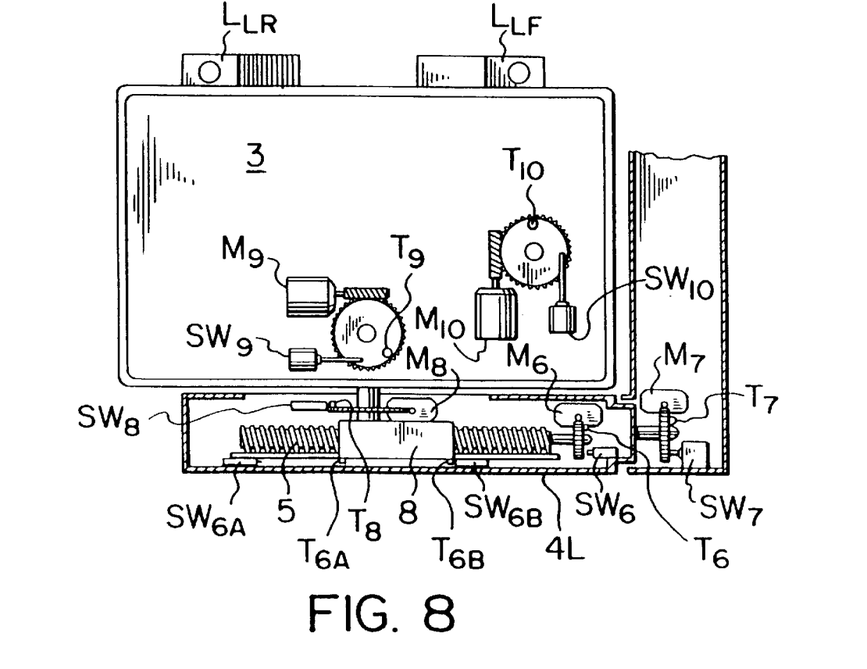
FIG. 8 is a sectional view illustrating part of the embodiment shown in FIG. 4.

(2) As the IG key switch $SW_{IG}$ is closed, the CPU causes, through the drive circuit 107, causes the step motor $M_7$, that drives the α-axis of the left mirror to rotate in a direction in which a protrusion $T_7$ (See FIG. 8) for detecting the position approaches the limit switch $SW_7$. Upon detecting the closure of the switch $W_7$, the CPU, through the drive circuit 107, causes the motor $M_7$ to rotate up to a rotational angle that has been stored as a return position in the form of a pulse count, so that the direction of the α-axis of the left mirror returns back to the return position set by the driver. Likewise, the β-axis ($M_8$, 108, $T_8$, $SW_8$), γ-axis ($M_9$ 109, $T_9$, $SW_9$) and δ-axis ($M_{10}$, 110, $T_{10}$, $SW_{10}$) of the left mirror and the α-axis, β-axis, γ-axis and δ-axis of the right mirror return to the initial positions set by the driver. As shown in FIG. 8, $T_6$ is a protrusion for detecting the position approaches the limit switch $SW_6$. $T_{6A}$ and $T_{6B}$ are also protrusions for detecting the positions approaches the limit switches $SW_{6A}$ and $SW_{6B}$, respectively.

[3] Operation of the mirror in a state of expanded visual field.

(1) The switches $SW_u$, $SW_D$, $SW_R$, and $SW_L$ of the mirror controller 30 may be depressed in excess of the rotational ranges (ranges for finely adjusting the mirror surface in the mirror case) of the γ-axis 24 and the δ-axis 25 (see FIG. 7) that have been set in the CPU in advance as pulse counts in a state where the right-and-left change-over switch $SW_{SEL}$ has been closed toward the side of the left mirror. Then, the CPU, through the straight-moving screw drive circuit 101, causes the straight-moving screw motor $M_5$ to be driven in the expanding direction for a predetermined period of time (e.g., five seconds) and further causes, through the drive circuits 109 and 110, the γ-axis motor $M_9$ and the δ-axis motor $M_{10}$ to be rotated up to the center of the range of rotation. "Expansion" herein means moving the mirror case toward the extreme outer end of the support arm 4 (see FIG. 8) in order to establish the state without a dead angle. The straight-moving screw motor $M_6$ comes to a stop as the circuit is opened by the operation of the expansion position limits switch $SW_{6B}$ (transfer to the state of an expanded visual field).

Thereafter, as the up-and-down direction adjustment switches $SW_u$, $SW_D$ and the right-and-left direction adjustment switches $SW_R$, $SW_L$ of the mirror controller 30 are depressed, the CPU causes, through the drive circuits 109 and 110, causes the corresponding γ-axis motor $M_9$ and the δ-axis motor $M_{10}$ to rotate in the directions in which the buttons are depressed. When the buttons are operated in excess of the above-mentioned range of rotation, the CPU, through the drive circuits 107 and 108, causes the α-axis motor $M_7$ and the β-axis motor $M_8$ in the mirror case to be rotated in the directions in which the adjustment switches are depressed for the period of time during which the switches are kept depressed. It is thus possible to see any objects that are desired to be seen (e.g., area where the front left wheel is touching the ground) from the driver's seat. In this case, the γ-axis motor $M_9$ and the δ-axis motor $M_{10}$ are rotated through the drive circuits 109 and 110 up to the center of the range of rotation, so that the mirror surface can be easily operated the next time. The CPU also sends a lamp turn-on signal to the turn-on circuit 111 to illuminate the area to which the mirror surface is facing in comparison with the angle of gaze of the driver that has been set in the CPU as a pulse count. When the light switch $SW_{HL}$ is closed (during the night), electric power is supplied to the circuit 111 and, hence, either the nighttime illumination lamp $L_{LF}$ or the $L_{LR}$ for the corresponding direction is activated. The foregoing was described the operation of the door mirror of the left side.

When the switch $SW_{SEL}$ is moved to the side of the right mirror, the CPU executes the same operations as those for the above-mentioned left mirror concerning the straight-moving screw motor $M_1$, γ-axis motor $M_4$, δ-axis motor $M_5$, α-axis motor $M_2$, β-axis motor $M_3$, drive circuits 101, 104, 105, 102, 103, expansion position limit switch $Sw_{1B}$, night-time illumination lamps $L_{RF}$, $L_{RR}$, and turn-on circuit 111 in response to the operations switches $SW_u$, $SW_D$, $SW_R$, and $SW_L$ of the mirror controller 30.

(2) When either the right or left mirror is in a state of expanded visual field, the CPU, through the right and left straight-moving screw drive circuits 101, causes the straight-moving screw motors $M_1$ and $M_6$ to be driven in the returning direction for a predetermined period of time (e.g., five seconds) and through the drive air units 102, 107, 103, 108, 104, 109, 105, 110, causes the right and left α-axis, β-axis, γ-axis and δ-axis motors $M_2$, $M_7$, $M_3$, $M_8$, $M_4$, $M_9$, $M_5$ and $M_{10}$ to be rotated up to the rotational angles (pulse counts) that have been stored as return positions set by the driver (return to the ordinary driving condition). The CPU causes this action (1) when there is no signal from the speed sensor $SSR_V$ for a preset period of time (e.g., one minute), the reverse gear switch $SW_{RV}$ of the vehicle has not been set to the reverse state, and none of the direction adjustment switches $SW_u$, $SW_D$, $SW_R$, and $SW_L$ of the mirror controller 30 is depressed, (2) when the vehicle speed has exceeded a preset forward speed (the reverse gear switch $SW_{RV}$ of the vehicle is not in the reverse state, and the speed sensor SSRv is detecting a speed of, for example, 10 Km/h), or (3) when the IG key switch $SW_{IG}$ is opened from the closed state. Under ordinary driving conditions, therefore, the mirror is automatically returned to and maintained in an ordinary driving orientation to maintain safe driving.

[4] Setting and calling the memory.

(1) With the IG key switch $SW_{IG}$ activated, when any one of the memory switches $SW_{MA}$, $SW_{MB}$, $SW_{MC}$, and $SW_{MD}$ is depressed within a predetermined period time (e.g., within 10 seconds) after the memory switch $SW_{MW}$ has been depressed, the CPU stores the expanded/returned state of the right and left mirror slide plates 8 at that moment and rotational angles (pulse counts) of the right and left α-axis, β-axis, γ-axis and δ-axis motors, $M_2$, $M_7$, $M_3$, $M_8$, $M_4$, $M_9$, $M_5$ and $M_{10}$ together with the memory switches (memory operation).

(2) With the IG key switch $SW_{IG}$ activated, when any one of the memory switches $SW_{MA}$, $SW_{MB}$, $SW_{MC}$, and $SW_{MD}$ is depressed, the CPU stores the expanded/returned state of the right and left mirror slide plates 8 at that moment and rotational angles (pulse counts) of the right and left α-axis, β-axis, γ-axis and δ-axis motors $M_2$, $M_7$, $M_3$, $M_8$, $M_4$, $M_9$, $M_5$ and $M_{10}$ as return positions set by the driver. The CPU also turns on the indicator LED that forms a pair with a memory switch that is depressed, and, through the straight-moving screw drive circuit 101, causes the straight-moving screw motors $M_1$ and $M_6$ to be rotated in order to reproduce the expanded/returned state of the right and left mirror slide plates 8R and 8L that are stored in the memory together with the switches. Through the drive circuits 102, 107, 103, 108, 104, 109, 105, 110, the CPU also causes the motors $M_2$, $M_7$, $M_3$, $M_8$, $M_4$, $M_9$, $M_5$ and $M_{10}$ in order to reproduce the rotational angles (pulse counts) of the right and left α-axis, β-axis, γ-axis and δ-axis (operation for calling memory).

(3) When a memory switch forming a pair with an indicator LED that is turned on is depressed in a state where the memory is called, the CPU causes, through the straight-moving screw drive circuit 101, causes the straight-moving screw motors $M_1$ and $M_6$ to rotate in order to reproduce the expanded/returned state of the right and left mirror slide plates 8R and 8L that are stored as return positions set by the driver at a moment when the operation is assumed for calling the memory. Through the drive circuits 102, 107, 103, 108, 104, 109, 105, 110, the CPU also causes the motors $M_2$, $M_7$, $M_3$, $M_8$, $M_4$, $M_9$, $M_5$ and $M_{10}$ in order to reproduce the rotational angles (pulse counts) of the right and left α-axis, β-axis, γ-axis and δ-axis (operation for resetting the memory). When either the right mirror or the left mirror is in a state of expanded visual field as a result of calling memory, the CPU resets the memory depending upon any one of the return conditions (1), (2) and (3) into the ordinary driving condition mentioned in 3-(2) above.

(4) When the memory switches $SW_{MA}$, $SW_{MB}$, $SW_{MC}$ and $SW_{MD}$ are in an initial state (as when a new vehicle is purchased), the CPU stores in advance the rotational angles (pulse counts) of the α-axis, β-axis, γ-axis and δ-axis of the right and left mirrors such that the positions that are most often desired to be seen by an operator are reflected on the mirrors (e.g., the memory switches $SW_{MA}$, $SW_{MB}$, $SW_{MC}$, and $SW_{MD}$ have been so adjusted and stored in the CPU that the areas where the front left wheel and front right wheel, front left wheel and rear right wheel, rear left wheel and rear right wheel, and rear left wheel and front right wheel touch the ground, can be seen on the right and left mirrors). Accordingly, the areas that are most often desired to be seen can be easily viewed without the need to reset the positions.

[5] Electrically powered folding.

Though not shown in FIG. 10, the mirror can be electrically folded by providing a folding mechanism in the base plate 2 with an electric motor and by providing a switch inside the vehicle.

The present invention makes it possible to accomplish all of the above-mentioned objects. That is, there is provided a door mirror with a small dead angle with which a driver manipulates indoor switches as required to automatically move the mirror surface of the door mirror of one side or both sides up to a predetermined angular position, so that the areas which are usually within dead angles are temporarily brought into view and then the mirror surface is automatically returned back to the initial state. Moreover, the door mirror makes it easier to pass another car ahead particularly when driving a car with an opposite side steering wheel (many imported cars are of this type). Furthermore, the door mirror with a small dead angle of the present invention makes it possible to easily and finely adjust the position and angle or the mirror surface depending upon a change in the position of the eyes when the vehicle is used by a different driver. The door mirror is confined within the amount of protrusion beyond the car body of a conventional door mirrors and can be expanded and stored as required.

In addition, the door mirror of the present invention may be equipped with movable sources of light that move together with the mirror surface and illuminate areas that are within dead angles without causing dazzle to the driver. Therefore, the driver is allowed to easily confirm the driving conditions even in darkness.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

I claim:

1. A vehicle door mirror, comprising:

a base mountable to a vehicle;

a support arm pivotally attached to the base, the support arm having a worm gear and a guide, and being pivotable about a lengthwise direction of the support arm;

a slide plate slidably engaging the guide for movement in the lengthwise direction of the support arm along the guide, said slide plate being adjustably slidable by rotation of the worm gear; and a mirror case pivotally attached to the slide plate, the mirror case being pivotable about a height direction of the mirror case perpendicular to the lengthwise direction of the support arm.

2. A door mirror according to claim 1, wherein at least one of the mirror case and the support arm has a movable source of light thereon.

3. A door mirror according to claim 1 or 2, wherein the base comprises a base plate and an auxiliary plate pivotally attached to the door, and the support arm is pivotally attached to the auxiliary plate.

4. A door mirror according to claim 1 or 2, wherein the mirror case comprises a rearview mirror case having a mirror surface, and includes a mechanism for finely adjusting a viewing angle of the mirror surface longitudinally and transversely with respect to the vehicle.

5. A door mirror according to claim 1, wherein:

the mirror has an ordinary mirror surface position set by a vehicle operator for viewing the rear of the vehicle, and a plurality of dead angle mirror surface positions predetermined by a vehicle operator for allowing the vehicle operator to view visual fields which are not clearly visible when the mirror is in the ordinary mirror position;

the mirror also including a control unit responsive to signals from a CPU, the CPU including stored information corresponding to the dead angle mirror surface positions; the control unit generating signals to move the mirror to position the mirror surface in a selected one of the dead angle mirror surface positions.

6. The door mirror according to claim 5, wherein the CPU also includes stored information corresponding to the ordinary mirror position, and the control unit includes a circuit for generating signals to move the mirror to the ordinary mirror position, the circuit being responsive to at least one of activation of a manually operated switch, passage of a predetermined period of time, attainment of a predetermined forward traveling speed of the vehicle, and deactivation of an ignition switch of the vehicle.

\* \* \* \* \*